US010844974B2

(12) United States Patent
Ducharme et al.

(10) Patent No.: US 10,844,974 B2
(45) Date of Patent: Nov. 24, 2020

(54) ELECTROMECHANICAL POLYMER PUMPS

(71) Applicant: Novasentis, Inc., Burlingame, CA (US)

(72) Inventors: Richard Ducharme, Alexandria, PA (US); Mark Levatich, State College, PA (US)

(73) Assignee: Novasentis, Inc., Burlingame, CA (US)

( * ) Notice: Subject to any disclaimer, the term of this patent is extended or adjusted under 35 U.S.C. 154(b) by 0 days.

(21) Appl. No.: 16/176,655

(22) Filed: Oct. 31, 2018

(65) Prior Publication Data

US 2019/0072086 A1   Mar. 7, 2019

Related U.S. Application Data

(62) Division of application No. 14/472,098, filed on Aug. 28, 2014, now Pat. No. 10,125,758.

(60) Provisional application No. 61/872,505, filed on Aug. 30, 2013.

(51) Int. Cl.
| | |
|---|---|
| *F16K 99/00* | (2006.01) |
| *F16K 31/00* | (2006.01) |
| *F04B 43/14* | (2006.01) |
| *F04B 43/00* | (2006.01) |
| *F04B 43/04* | (2006.01) |

(52) U.S. Cl.
CPC ...... *F16K 99/0049* (2013.01); *F04B 43/0054* (2013.01); *F04B 43/04* (2013.01); *F04B 43/14* (2013.01); *F16K 31/005* (2013.01)

(58) Field of Classification Search
CPC .... F16K 99/0049; F16K 31/005; F04B 43/04; F04B 43/0054; F04B 43/14
See application file for complete search history.

(56) References Cited

U.S. PATENT DOCUMENTS

| | | | | |
|---|---|---|---|---|
| 7,537,197 | B2 * | 5/2009 | Heim | F16K 99/0001 239/601 |
| 9,053,617 | B2 * | 6/2015 | Ramstein | G06F 3/016 |
| 9,183,710 | B2 * | 11/2015 | Zellers | G08B 6/00 |

* cited by examiner

*Primary Examiner* — Eric Keasel
(74) *Attorney, Agent, or Firm* — Hogan Lovells US LLP

(57) ABSTRACT

A motor-less pump includes: (a) a housing having an inlet provided to allow fluid flow into the housing and an outlet provided to allow fluid flow out of the housing; (b) an elastic diaphragm positioned in the housing such that motion in the elastic diaphragm drives the fluid flows at the inlet and the outlet of the housing; and (c) one or more electromechanical polymer (EMP) actuators each being provided on a surface of the elastic diaphragm, wherein the mechanical responses to electrical stimuli applied on the EMP actuators cause the motion in the diaphragm. The EMP actuators may include one or more bimorphs.

9 Claims, 3 Drawing Sheets

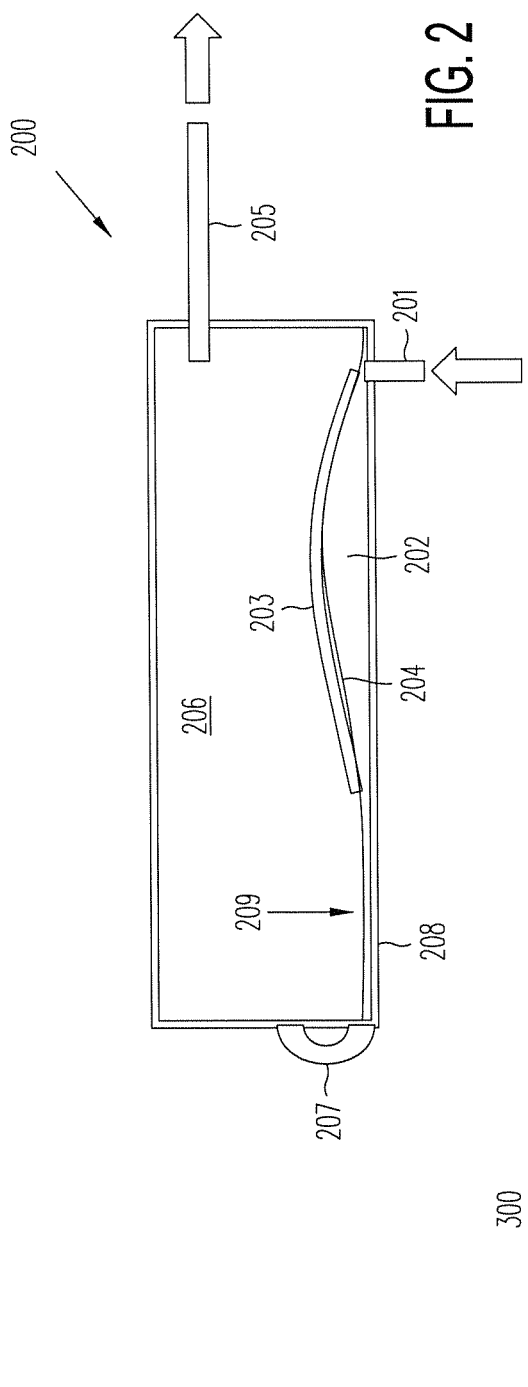
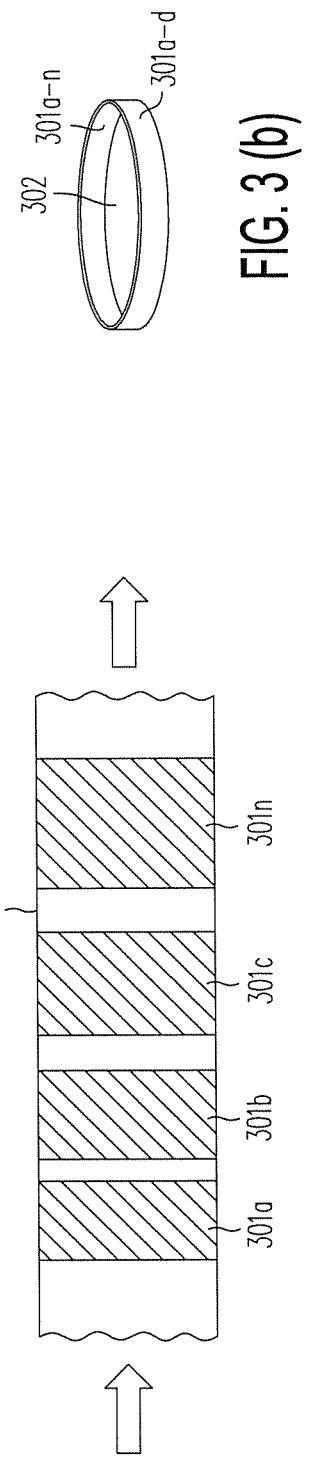

ELECTROMECHANICAL POLYMER PUMPS

CROSS REFERENCE TO RELATED APPLICATION

The present application is a divisional of U.S. application Ser. No. 14/472,098 filed Aug. 28, 2014, which claims priority to U.S. Provisional Patent Application Ser. No. 61/872,505, filed on Aug. 30, 2013, which are hereby incorporated by reference in their entirety for all purposes as if fully set forth herein.

BACKGROUND OF THE INVENTION

Field of the Invention

The present invention relates to electromechanical polymer (EMP) devices. In particular, the present invention relates to EMP pumps in which the pumping action is provided by EMP devices.

Discussion of the Related Art

In medical applications, micro-pumps and infusion pumpS have been used to administer drugs according to dose profiles. Typically, the drug is administered by the pump over a prescribed time period directly into the patient's body through a needle or cannula. Because of the high cost of such a pump, the patient is required to be present at a clinical facility (e.g., a hospital) to receive the drug administration. A low-cost, disposable motor-less pump would enable administration—especially for a long dose—of a water-soluble drug without hospitalization. Such a disposable pump would not only be readily received into the market, it would also expand the total addressable market for infusion pumps to developing countries, where the number of patients who need to be hospitalized for treatment regularly exceeds available beds.

Furthermore, a premium precision pump loaded with chemotherapy drugs would significantly improve the quality of life for cancer patients. Currently, a cancer patient receiving chemotherapy must spend long periods of time receiving infusions of the drugs in a hospital. This procedure is not only taxing on the patient, but also very costly. Thus, a pump that would require only an initial professional application (e.g., by a nurse), but would then allow the patient to leave the hospital while the drug is slowly infused is highly desired.

SUMMARY

According to one embodiment of the present invention, a motor-less pump includes: (a) a housing having an inlet provided to allow fluid flow into the housing and an outlet provided to allow fluid flow out of the housing; (b) an elastic diaphragm positioned in the housing such that motion in the elastic diaphragm drives the fluid flows at the inlet and the outlet of the housing; and (c) one or more electromechanical polymer (EMP) actuators each being provided on a surface of the elastic diaphragm, wherein the mechanical responses to electrical stimuli applied on the EMP actuators cause the motion in the diaphragm. The EMP actuators may include one or more bimorphs. A battery may be provided to power generation of electrical stimuli. The EMP actuators may be provided in various configurations, such as sides of a polygon, forming a radiating pattern, covering an entire surface of the elastic diaphragm, and annular rings that may be actuated individually or in unison. The activating signal for the EMP actuators may be provided by an input voltage that is a combination of an AC signal with a DC offset signal. In one embodiment, the motor-less pump is also provided programmable means capable of disabling the mechanical responses of the EMP actuators.

According to one embodiment of the present invention, a pressure-sensitive valve includes: (a) a mechanical valve which controls fluid flow by opening and closing; and (b) one or more EMP actuators attached to the valve acting as pressure sensors and actuators, wherein when one or more of the pressure sensors sense a fluid pressure reaching a predetermined threshold, the pressure sensors cause electrical stimuli to be applied to the EMP actuators to enable opening of the mechanical valve. One or more of the EMP actuators may act as both sensor and actuator. In one embodiment, the EMP actuators are driven by a signal having a frequency in the human audible range. Some examples of mechanical valves suitable for use within the scope of the present invention include a wedge-shaped valve and an umbrella-shaped valve.

According to one embodiment of the present invention, a motor-less pump includes: (a) a housing having an inlet provided to allow fluid flow into the housing and an outlet provided to allow fluid flow out of the housing; (b) an elastic membrane positioned to divide the housing into a first space and a second space joined by a fluid conduit; and (c) one or more electromechanical polymer (EMP) actuators, wherein the EMP actuators receive electrical stimuli to provide mechanical responses for driving the elastic membrane, such that (i) when the elastic membrane is driven towards a relaxed state, the membrane is moved to a position at the inlet such that fluid flow into the first space is blocked, and fluid flows from the first space into the second space, and (ii) when the elastic membrane is driven to an extended state, the elastic membrane drives fluid flow from the second space through the outlet out of the housing.

According to one embodiment of the present invention, a motor-less pump includes: (a) a housing having an inlet provided to allow fluid flow into the housing and an outlet provided to allow fluid flow out of the housing, the inlet and outlet being connected by a conduit for fluid flow between the inlet and the outlet; and (b) a plurality of electromechanical polymer (EMP) actuator pairs being provided along the conduit, each EMP actuator pair comprising two or more EMP actuators that are positioned opposite each other and configured to bend away from a center point of the conduit, such that when the EMP actuators are activated according to a predetermined pattern, a fluid flow is created to transport a mass of fluid from the inlet to the outlet. The conduit may provide a helical flow path. In one embodiment, each EMP actuator pair includes EMP actuators arranged in triplicates.

Because the EMP pumps are disposable and may be shipped with the drugs to be administered in prescribed dosages, these pumps may be made available cost-effectively for a wide spectrum of applications (e.g., from low-cost to premium markets). EMP pumps are quiet, have fewer moving parts, and do not break when dropped.

The present invention is better understood upon consideration of the detailed description below in conjunction with the accompanying drawings.

BRIEF DESCRIPTION OF THE DRAWINGS

FIG. 2 is a schematic diagram illustrating valve-less EMP pump 200, in accordance with one embodiment of the present invention.

FIGS. 3(a) and 3(b) show longitudinal and horizontal cross sections of peristaltic pump 300.

DETAILED DESCRIPTION OF THE PREFERRED EMBODIMENTS

The present invention takes advantage of the electromechanical properties of a class of materials referred to as electromechanical polymers (EMPs). When an EMP material receives an electrical stimulus, the EMP material provides a mechanical response (e.g., an increase in volume) that can be used in an EMP actuator to create a force, displacement, or motion. EMP actuators suitable for implementing devices of the present invention are described, for example, in copending U.S. patent application ("Copending Patent Application"), Ser. No. 13/683,990, entitled "Systems Including Electromechanical Polymer Sensors and Actuators," filed on Nov. 21, 2012. The disclosure of Copending Patent Application is hereby incorporated by reference in its entirety. Typically, such an EMP actuator may include one or more layers of an EMP material provided between electrodes across which an electrical signal (e.g., a voltage) may be applied.

Figure 1:
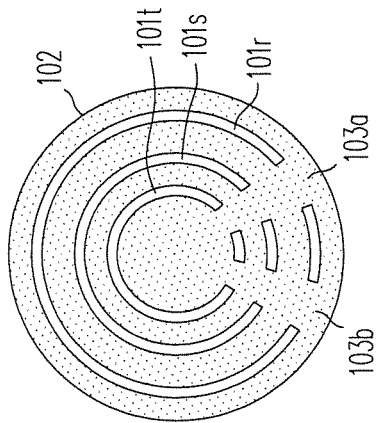
FIGS. 1(a)-1(f) show EMP actuators of various forms being attached to an elastic substrate to provide a diaphragm, in accordance with one embodiment of the present invention.
Figure 1:
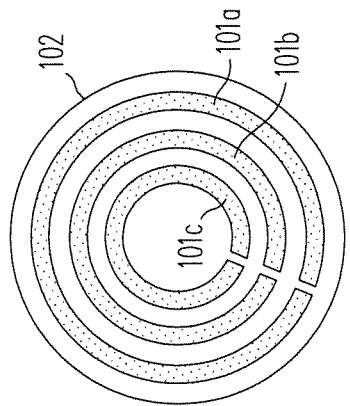
Figure 1:
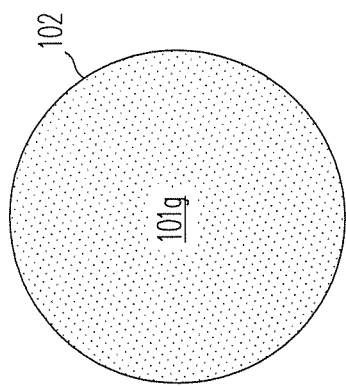
Figure 1:
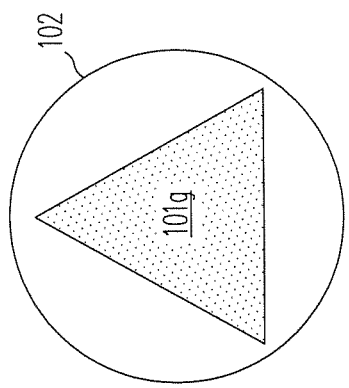
Figure 1:
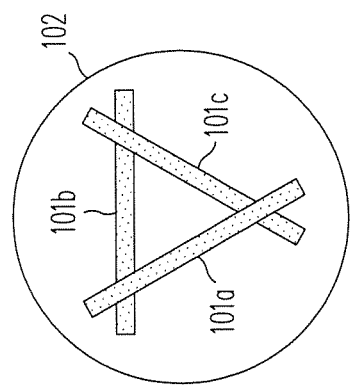
Figure 1:
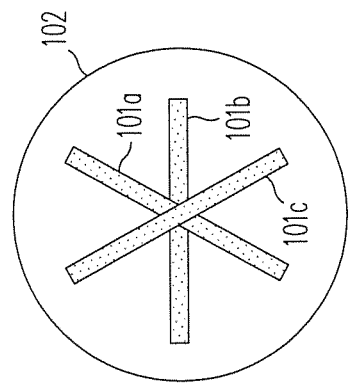

According to one embodiment of the present invention, a micro-infusion pump may incorporate one or more EMP actuators to provide a low-profile, low-cost, and sufficiently low-power pump that is operable by a battery. For example, an EMP actuator may be attached to or embedded in an elastic substrate to provide a diaphragm that can be used in a pump. FIGS. 1(a)-1(f) show EMP actuators of various forms each being attached to an elastic substrate to provide a diaphragm. For example, as shown in FIGS. 1(a) and 1(d), rectangular strips of EMP actuators (e.g., EMP actuators 101a, 101b and 101c) may be formed on or embedded in elastic substrate 102 and individually activated to deform elastic substrate 102. When an EMP actuator is activated and deactivated in rapid succession, a back-and-forth motion may be created. The various placements of the EMP actuators relative to each other and their respective actuations in time can be used to create complex mechanical actions.

Other examples of diaphragm configurations are shown in (i) FIGS. 1(b) and 1(e), in which EMP actuator 1 0 1g covers entirely or a substantial portion of the surface of elastic substrate 102, and (ii) FIGS. 1(c) and 1(f), in which annular EMP actuators 101r, 101s, and 101t are provided on elastic substrate 102 in configurations that allow concerted actuation and individual activation, respectively. In FIG. 1(c), EMP actuators 101r, 101s and 101t are connected by conductors 103a and 103b to allow EMP actuators 101r, 101s and 101t to be activated at the same time. By suitable placement of electrodes, EMP actuators capable of bending in two opposite directions (i.e., a bimorph) may be created. A bimorph actuated diaphragm doubles the efficiency of the pump. By varying the voltages applied to the EMP actuators, various amounts of displacement, vibration frequencies, and pressures may be achieved. In many applications, an EMP actuator may be pre-biased by a predetermined voltage. Those applications may involve applying an input voltage that is a combination of an AC signal with a DC offset signal. As can be seen from FIGS. 1(a) to 1(d), practically any shape may be provided to construct a diaphragm of any desired characteristics.

According to one embodiment of the present invention, the EMP pumps may be provided programmable means (e.g., an electrically programmable fuse) to self-disable. This is a safety feature to prevent re-use of a disposable EMP pump in a medical application. Preventing re-use avoids inadvertent contagious disease transmission. Disabling of the EMP pump may be carried out using a signal that disconnects, disables or shorts the EMP actuator.

According to one embodiment of the present invention, EMP actuators of the present invention can be used under fluid pressure to create dynamic valves that open and close under electrical control, thereby providing a low flow-rate output flow. In some embodiments, an EMP actuator may also serve at the same time as a pressure sensor. (An EMP actuator that can also serve as an EMP sensor is described in the Copending Patent Application.) Acting as an EMP sensor, the EMP actuator can trigger valve operation based on detecting a predetermined pressure threshold. Based on the pressure sensed, the EMP sensor may program the amount of movement or displacement appropriate for the predetei wined pressure. Alternatively, separate EMP sensors may be provided in the vicinity of the EMP actuators. Using EMP actuators also as EMP sensors provide a low profile pump. The EMP actuators can be stimulated by signals in the audio frequency range (e.g., 50 Hz to 20,000 Hz). In that frequency range, vibration of the EMP actuators may produce audible sound, which may be useful as an audible alert.

FIG. 2 is a schematic diagram illustrating valve-less EMP pump 200, in accordance with one embodiment of the present invention. In a conventional pump, as mere vibration of an actuator yields very little volume per cycle, a small flow volume is typically held back by a typical valve that requires a minimum pressure and flow volume to open. As shown in FIG. 2, membrane 204 in which EMP actuator 203 is embedded, acts as a valve that opens and closes in synchrony with EMP actuator 203. As explained below, the opening and closing are in synchrony with the vibration of membrane 204, as membrane 204 and EMP actuator 203 form parts of the same structure. As shown in FIG. 2, under electrical control, EMP actuator 203 moves up to allow fluid to flow into space 202 through inlet 201. At the same time, the upward movement of EMP actuator 203 increases the pressure in cavity 206, which is located above EMP actuator 203. The resulting pressure holds the portion of membrane 204 that is to the left of EMP actuator 203 (indicated in FIG. 2 by arrow 209) snugly against the bottom wall of housing 208, thereby preventing fluid from flowing through tube 207 from cavity 206 back into space 202. At the same time, the increase in pressure in cavity 206 pushes fluid out of cavity 206 into outlet 205.

In this embodiment, inlet 201 is covered by membrane 204 by EMP actuator 203, such that no fluid is drawn into space 202 until halfway through the lift cycle (i.e., the edge of EMP actuator 203 does not lift membrane 204 clear of inlet 201 to allow fluid flow until EMP actuator 203 is actuated for a predetermined amount of time or displaced a predetermined distance).

When the voltage applied to EMP actuator 203 is removed, EMP actuator 203 moves down, such that some fluid flows back through outlet 205 back into space 202. The descending membrane 204 once again covers the inlet 201, while the rest of the fluid in space 202 under EMP actuator 203 is pushed out under membrane 204 to the left of actuator 203 through pipe 207 into cavity 206 above EMP actuator 203.

According to one embodiment of the present invention, EMP actuators may be incorporated into a peristaltic pump. FIGS. 3(a) and 3(b) show longitudinal and horizontal cross sections of peristaltic pump 300. As shown in FIG. 3(a), peristaltic pump 300 includes a series of EMP actuator pairs 301a, 301b, 301n. Each EMP actuator pair includes two or more EMP actuators (e.g., EMP actuators 301a-u and 301a-d) that are positioned opposite each other and configured to bend away from center 302 of tubular housing 304. Tubular housing 304 is preferably a flat tube which is closed completely when the EMP actuator pairs are not activated. When the series of EMP actuator pairs are opened up, fluid passes through tubular housing 304 from EMP actuator pair to a next EMP actuator pair.

Figure 4:
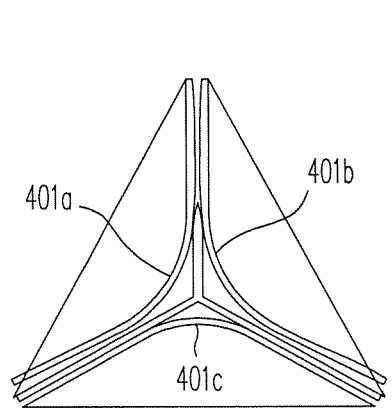
FIGS. 4(a) and 4(b) show longitudinal and horizontal cross sections of helical bubble-pass pump 400, which include a series EMP of actuators in triplicates.
Figure 4:
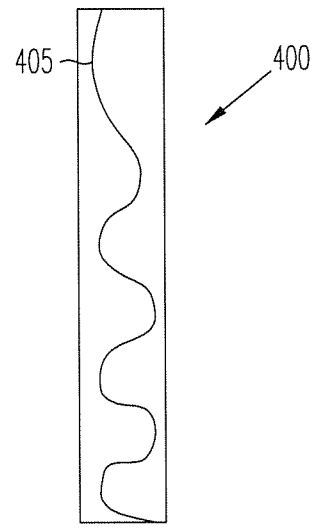

According to one embodiment of the present invention, EMP actuators can be activated in a predetermined pattern to compress selected segments of a tube to move fluid forward. For example, FIGS. 4(a) and 4(b) show longitudinal and horizontal cross sections of helical bubble-pass pump 400, which include a series of EMP actuators in triplicates. The EMP actuators (e.g., EMP actuator triplicate 401a, 401b and 401c) can be charged and discharged, so as to move a pad of fluid through a tube along helical path 405. The EMP actuators push into the center of the tube.

Figure 5:
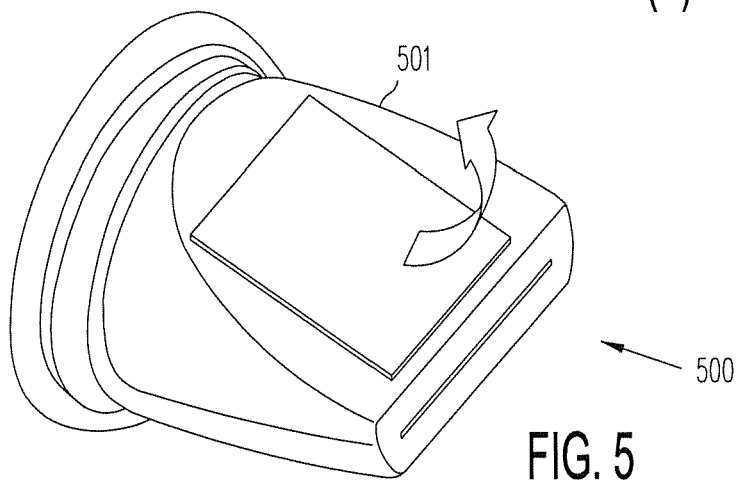
FIG. 5 shows duckbill valve 500 assisted by EMP actuator 501, in accordance with one embodiment of the present invention.

According to one embodiment of the present invention, EMP actuators can be used in actively assisted pressure valves. Such actively assisted pressure valves may operate at a lower pressure than can be achieved in the prior art. Rather than relying on pressure alone to coerce a pressure valve to open, one or more EMP actuators can act as sensors of the fluid pressure. At a predetermined threshold, such as a threshold pressure that is substantially lower than the threshold pressure at which a passive pressure valve would normally open, the EMP actuators are then activated to provide a force that forces the pressure valve to open. FIG. 5 shows duckbill valve 500 assisted by EMP actuator 501, in accordance with one embodiment of the present invention.

An EMP layer in an EMP sensor or an EMP actuator of the present invention, in film form, may be selected from any of: P(VDFx-TrFEy-CFEi-x-y), P(VDFx-TrFEy-CTFEi-x-y), poly(vinylidene fluoride-trifluoroethylene vinylidene chloride) (P(VDF-TrFE-VC)), poly(vinylidene fluoride-tetrafluoroethylenechlorotrifluoroethylene) (P(VDF-TFE-CTFE)), poly(vinylidene fluoride-trifluoroethylene-hexafluoropropylene), poly(vinylidene fluoride-tetrafluoroethylene-hexafluoropropylene), poly(vinylidene fluoride-trifluoroethylene-tetrafluoroethylene), poly(vinylidene fluoride-tri fluoroethylene-vinyl fluoride), poly(vinylidene fluoride-tetrafluoroethylene-vinyl fluoride), poly(vinylidene fluoride-trifluoroethylene-perfluoro(methyl vinyl ether)), poly(vinylidene fluoride-tetrafluoroethylene-perfluoro(methyl vinyl ether)), poly(vinylidene fluoride-trifluoro ethylene-bromotrifluoroethylene, polyvinylidene), poly(vinylidene fluoride-tetrafluoroethylenechlorofluoroethylene), poly(vinylidene fluoride-trifluoroethylene-vinylidene chloride), and poly(vinylidene fluoride-tetrafluoroethylene-vinylidene chloride), or in a general form of P(VDFx-2nd monomery-3rd monomerl-x-y), where x may range from 0.5 to 0.75, and y may range from 0.45 to 0.2. Suitable polymers are also described in U.S. Pat. No. 6,787,238.

A suitable EMP layer can also be selected from crosslinked terpolymers described above or P(VDFx-TrFE1-x) copolymers, where x varies from 0.5 to 0.75 (See, e.g., U.S. Pat. Nos. 6,423,412 and 6,605,246 for representative copolymers and compositions). A suitable EMP can be selected from the copolymer of P(VDF1-x-CTFEx) or P(VDF1-x-HFPx) where x ranges from 0.03 to 0.15 in moles. A suitable EMP can be a blend of one or more terpolymers with one or more other polymers. The EMP film can be uniaxially stretched and in fabricating the EMP actuator, the uniaxial stretching direction may be along the displacement direction of the actuator. The EMP films can be in a non-stretched form or biaxially stretched.

An EMP layer for an EMP actuator of the present invention may include semi-crystalline electromechanical polymer-based actuator materials (e.g., modified P(VDF-TrFE)), which provide remarkably improved performance for high definition haptics in handheld consumer devices. The EMP actuators of the present invention are shock-tolerant, require modest voltages consistent with requirements in OEM products, and are capable of high definition responses. Such an electro-active material can exhibit significant electrostriction (e.g., an electric field-induced strain 7%, a 70 times increase over the conventional piezo-ceramics and piezo-polymers). Furthermore, this class of polymers also possesses a high force capability, as measured by the high elastic energy density of 1 J/cm3. Suitable EMPs in this class include crosslinked poly(vinylidene fluoridetrifluoroethylene) (P(VDF-TrFE), as described in U.S. Pat. Nos. 6,423,412 and 6,605,246), P(VDF-TrFE)-based terpolymers, such as poly(VDF-TrFE-chlorotrifluoroethylene), (P(VDF-TrFE-CTFE)), poly(vinylidene fluoride-trifluoroethylene-chlorofluoroethylene), (P(VDF-TrFE-CFE)), and the like. U.S. Pat. No. 6,787,238). The disclosures in patent applications referred to in this application are incorporated herein by reference. The EMP layer may also be a relaxor ferroelectric polymer. A relaxor ferroelectric polymer may be a polymer, copolymer, or terpolymer of vinylidene fluoride. Examples include P(VDF-TrFE-CFE) or P(VDF-TrFE-CTFE) terpolymer, a crosslinked P(VDFx-TrFEI-x) copolymer, where x is between 0.5 and 0.75 inclusive, P(VDF1-x-CTFEx) or P(VDF1-x-HFPx) where x is in the range from 0.03 to 0.15 molar, polymer blends such as blends of P(VDF-CTFE) with P(VDF-TrFE-CFE) or P(VDF-TrFE-CTFE), where the content of P(VDF-CTFE) is between 1% and 50% by weight.

The above detailed description is provided to illustrate specific embodiments of the present invention and is not intended to be limiting. Numerous variations and modification within the scope of the present invention are possible. The present invention is set forth in the accompanying claims.

We claim:

1. An apparatus comprising:
   a pressure-sensitive valve which controls fluid flow by opening when fluid pressure asserted on the pressure-sensitive valve exceeds a minimum pressure; and
   one or more electromechanical polymer (EMP) actuators attached to the pressure-sensitive valve acting as pressure sensors and actuators, wherein when one or more of the pressure sensors sense a fluid pressure reaching a predetermined threshold, the pressure sensors cause electrical stimuli to be applied to the one or more EMP actuators to enable opening of the pressure-sensitive valve, wherein the predetermined pressure threshold is less than the minimum pressure.

2. The apparatus of claim 1, wherein the one or more EMP actuators are driven by a signal having a frequency in the human audible range.

3. The apparatus of claim 1, wherein the pressure-sensitive valve comprises a wedge-shaped valve.

4. The apparatus of claim 1, wherein the predetermined threshold is based on a type of the pressure-sensitive valve.

5. The apparatus of claim 1, further comprising one or more EMP sensors.

6. The apparatus of claim 1, wherein the one or more EMP actuators determine an amount of movement of the pressure-sensitive valve.

7. A method of operating a pressure-sensitive valve, the method comprising:
   controlling fluid flow by opening and closing the pressure valve, wherein the pressure-sensitive valve opens when fluid pressure asserted on the pressure-sensitive valve exceeds a minimum pressure;
   sensing a fluid pressure reaching a predetermined threshold using one or more pressure sensors, wherein the predetermined threshold is less than the minimum pressure; and
   applying electrical stimuli to one or more electromechanical polymer (EMP) actuators based on the sensed fluid pressure, wherein the applying electrical stimuli to the one or more EMP actuators enables opening of the pressure-sensitive valve, and wherein the one or more EMP actuators acts as the one or more pressure sensors and actuators.

8. The method of claim 7 further comprising: driving the one or more EMP actuators using a signal having a frequency in the human audible range.

9. The method of claim 7, wherein the pressure-sensitive valve comprises a wedge-shaped valve.

* * * * *